(12) United States Patent
Hayk et al.

(10) Patent No.: US 9,678,539 B2
(45) Date of Patent: Jun. 13, 2017

(54) FLEXIBLE DISPLAY DEVICE

(71) Applicant: SAMSUNG DISPLAY CO., LTD., Yongin-si, Gyeonggi-do (KR)

(72) Inventors: Khachatryan Hayk, Hwaseong-si (KR); Hyun Woo Koo, Hwaseong-si (KR); Tae Woong Kim, Yongin-si (KR)

(73) Assignee: SAMSUNG DISPLAY CO., LTD., Yongin-Si, Gyeonggi-Do (KR)

( * ) Notice: Subject to any disclaimer, the term of this patent is extended or adjusted under 35 U.S.C. 154(b) by 0 days.

(21) Appl. No.: 14/962,085

(22) Filed: Dec. 8, 2015

(65) Prior Publication Data

US 2016/0216737 A1 Jul. 28, 2016

(30) Foreign Application Priority Data

Jan. 22, 2015 (KR) ........................ 10-2015-0010841

(51) Int. Cl.
*G06F 1/16* (2006.01)

(52) U.S. Cl.
CPC .......... *G06F 1/1652* (2013.01); *G06F 1/1624* (2013.01); *G06F 1/1626* (2013.01)

(58) Field of Classification Search
CPC .................................................... G06F 1/1652
See application file for complete search history.

(56) References Cited

U.S. PATENT DOCUMENTS

| 6,762,929 B2 * | 7/2004 | Sawyer | G06F 1/1601 248/535 |
| 6,771,232 B2 * | 8/2004 | Fujieda | G06F 1/1615 345/30 |
| 6,806,850 B2 * | 10/2004 | Chen | G06F 1/1616 345/7 |
| 7,830,333 B2 * | 11/2010 | Aoki | G06F 1/1601 345/1.3 |
| 8,363,393 B2 * | 1/2013 | Bemelmans | G06F 1/1601 248/917 |
| 8,379,377 B2 * | 2/2013 | Walters | G06F 1/1641 248/917 |

(Continued)

FOREIGN PATENT DOCUMENTS

| EP | 2546720 A2 | 7/2012 |
| KR | 10-1999-0029568 A | 4/1999 |

(Continued)

OTHER PUBLICATIONS

"Flexible Display Technology and Market Forecast", Flexible Display Overview and Property, Display Bank, 2012-2020, pp. 1-13.

*Primary Examiner* — Lisa Lea Edmonds (74) *Attorney, Agent, or Firm* — Lee & Morse P.C.

(57) ABSTRACT

A display device includes a first body including a first internal space and a first opening at a first side of the first body, a second body including a second internal space and a second opening at a first side of the second body, the second opening facing the first opening, a flexible display panel to display images, the flexible display panel having a changeable display area in accordance with a distance between the first and second bodies, and an arm assembly including a plurality of connecting arms supporting the first and second bodies, the plurality of connecting arms being rotatably coupled to the first and second bodies.

13 Claims, 11 Drawing Sheets

(56) References Cited

U.S. PATENT DOCUMENTS

| | | |
|---|---|---|
| 8,385,055 B2 | 2/2013 | Kao et al. |
| 8,644,010 B2 * | 2/2014 | Mullen ................. G06F 1/1624 345/8 |
| 8,711,566 B2 * | 4/2014 | O'Brien ................ G06F 1/1624 361/724 |
| 9,286,812 B2 * | 3/2016 | Bohn ....................... G09F 9/301 |
| 9,348,450 B1 * | 5/2016 | Kim ...................... G06F 3/0412 |
| 2001/0003450 A1 * | 6/2001 | Hemia ................. G06F 1/1615 345/170 |
| 2007/0211036 A1 | 9/2007 | Perkins |
| 2012/0044620 A1 * | 2/2012 | Song .................... G06F 1/1616 361/679.01 |
| 2012/0300419 A1 | 11/2012 | Tang et al. |
| 2012/0314399 A1 | 12/2012 | Bohn et al. |
| 2012/0314400 A1 | 12/2012 | Bohn et al. |
| 2013/0180882 A1 | 7/2013 | Hamers et al. |
| 2013/0194761 A1 | 8/2013 | Kim |
| 2015/0023030 A1 * | 1/2015 | Tsukamoto ........... G06F 1/1652 362/419 |
| 2015/0153787 A1 * | 6/2015 | Mok ..................... G06F 1/1652 361/679.27 |
| 2015/0373863 A1 * | 12/2015 | Lin ........................ A45C 11/00 206/774 |
| 2016/0085265 A1 * | 3/2016 | Park ..................... G06F 1/1652 361/807 |
| 2016/0120022 A1 * | 4/2016 | Lee ....................... G06F 1/1652 361/749 |
| 2016/0170450 A1 * | 6/2016 | Kim ....................... G06F 1/166 361/807 |

FOREIGN PATENT DOCUMENTS

| | | |
|---|---|---|
| KR | 10-2005-0085412 A | 8/2005 |
| WO | WO 2006/038171 A1 | 4/2006 |
| WO | WO 2006/085271 A2 | 8/2006 |
| WO | WO 2008/054206 A2 | 5/2008 |

* cited by examiner

FLEXIBLE DISPLAY DEVICE

CROSS-REFERENCE TO RELATED APPLICATION

Korean Patent Application No. 10-2015-0010841, filed on Jan. 22, 2015, in the Korean Intellectual Property Office, and entitled: "Display Device," is incorporated by reference herein in its entirety.

BACKGROUND

1. Field

The present disclosure relates to a display device that includes a flexible display panel.

2. Description of the Related Art

A display device displays images, and a flexible display device has recently received much attention. The conventional flexible display device represents a device including a flexible display panel for displaying images, and the flexible display panel may be folded or rolled to reduce its size and allow portability.

SUMMARY

An exemplary embodiment provides a display device including a first body including a first internal space and a first opening at a first side of the first body, a second body including a second internal space and a second opening at a first side of the second body, the second opening facing the first opening, a flexible display panel to display images, the flexible display panel having a changeable display area in accordance with a distance between the first and second bodies, and an arm assembly including a plurality of connecting arms supporting the first and second bodies, the plurality of connecting arms being rotatably coupled to the first and second bodies.

The arm assembly may include: supporting shafts fixed to each of the first and second bodies; connecting arms rotatably coupled to the supporting shafts; and a variable shaft connecting the connecting arms and being rotatably installed with respect to the connecting arms.

Two first supporting shafts separated from each other may be installed in the first body; two second supporting shafts separated from each other may be installed in the second body; connecting arms may be rotatably installed at each of the first and second supporting shafts; and the variable shaft may rotatably connect the connecting arms respectively connected to the first and second bodies.

A first cover may be coupled to the first body; a hole through which the flexible display panel passes may be formed in the first cover; and a first supporting plate may be slidably coupled to the first body.

A mounting groove into which the first supporting plate is inserted may be formed in an inner wall surface of the first body; a supporting pin may be formed to protrude on a lateral surface of the first supporting plate; and a guide groove into which the supporting pin may be inserted is formed to be elongated in a moving direction of the first supporting plate in the mounting groove.

A second supporting plate may be slidably coupled to the second body; a side end of the first supporting plate may be disposed to face a side end of the second supporting plate; a connecting protrusion may be formed to protrude toward the second supporting plate on the first supporting plate; and a connecting groove into which the connecting protrusion is inserted may be formed in the second supporting plate.

A catching protrusion protruded toward the second body may be formed on the first body; and a locking groove into which the catching protrusion is inserted and locked may be formed in a lateral surface of the second body facing the first body.

A first roller around which one side end portion of a length direction of the flexible display panel is wound may be installed at the first body; and a second roller around which the other side end portion of the length direction of the flexible display panel is wound may be installed at the second body.

A first supporting rod may be installed at one side end portion of a length direction of the flexible display panel; a second supporting rod may be installed at the other side end portion of the length direction of the flexible display panel; the flexible display panel may be installed to surround the first and second bodies; and the first and second supporting rods may be respectively disposed under the first and second bodies. The first and second supporting rods may be coupled to each other with an elastic body therebetween.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

In addition, unless explicitly described to the contrary, the word "comprise" and variations such as "comprises" or "comprising" will be understood to imply the inclusion of stated elements but not the exclusion of any other elements. Further, throughout the specification, "on" implies being positioned above or below a target element, and does not imply being necessarily positioned on the top on the basis of a gravity direction.

Figure 1:
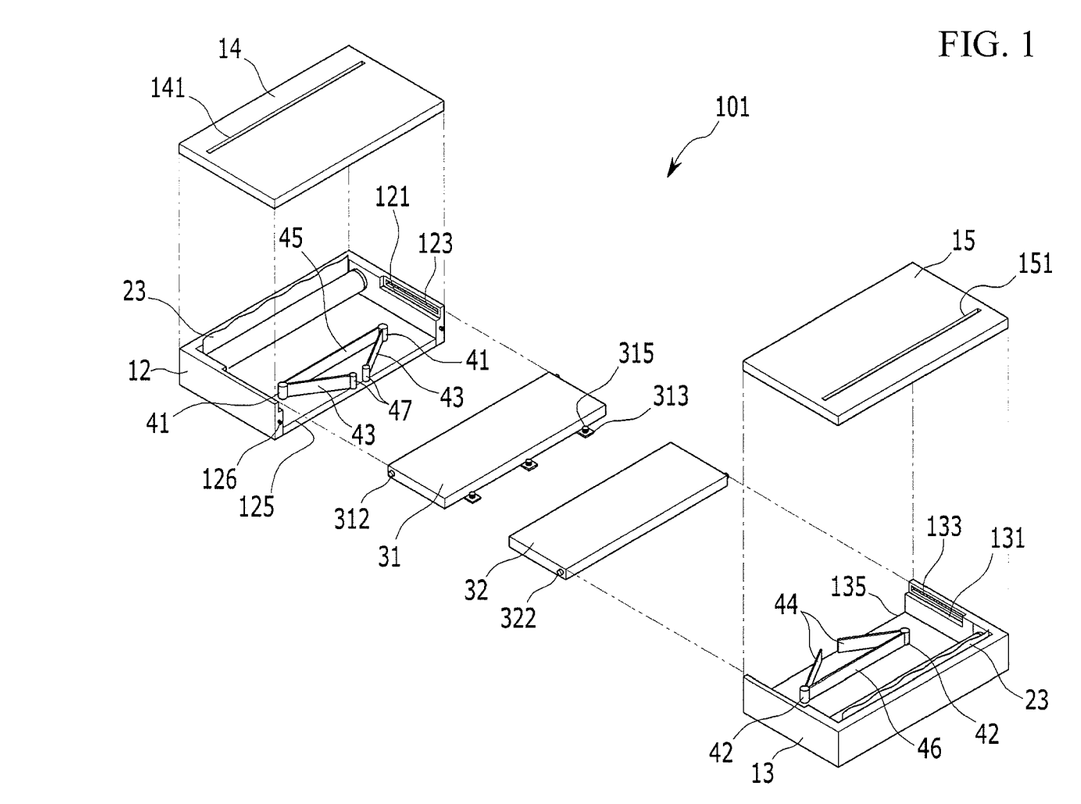
FIG. 1 illustrates an exploded perspective view of a display device according to a first exemplary embodiment.
Figure 2:
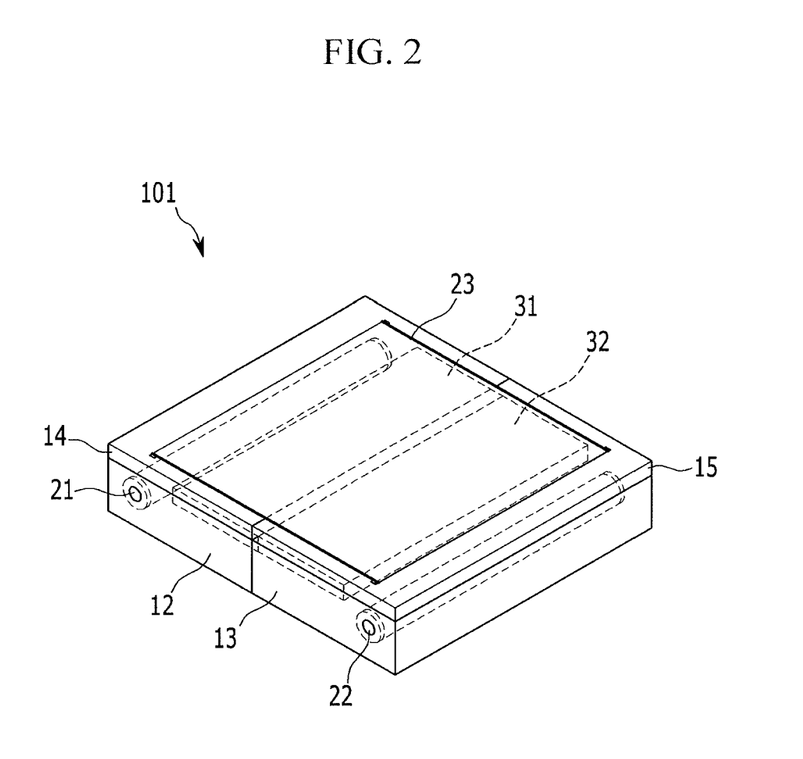
FIG. 2 illustrates an assembled perspective view of a display device according to the first exemplary embodiment.

FIG. 1 illustrates a perspective view of a display device according to a first exemplary embodiment, and FIG. 2 illustrates an enlarged perspective view of the display device according to the first exemplary embodiment.

Referring to FIGS. 1 and 2, a display device 101 according to the first exemplary embodiment may include a flexible display panel 23, a first body 12, a second body 13, an arm assembly 40 (FIG. 4), a first supporting plate 31, and a second supporting plate 32.

The flexible display panel 23 displays images, moving pictures, or texts that are processed in the display device. For example, when the display device is a portable terminal, e.g., a mobile phone, the flexible display panel 23 may display images, e.g., of a user interface (UI), a graphical user interface (GUI), or the like, associated with a call. The flexible display panel 23 may include flexible substrates or films facing each other with a liquid crystal or an organic light emitting element therebetween.

The flexible display panel 23 may be formed to be transparent or light-transmissive so that the outside may be viewed through the flexible display panel 23. A touch sensor having a form of a touch film, a touch sheet, or a touch pad to sense a touch operation may be provided on a front surface of the flexible display panel 23.

The flexible display panel 23 has a flexible characteristic, and it may inserted into the first body 12 and the second body 13 or be drawn out therefrom. As illustrated in FIG. 2, a first side end portion of a length direction of the flexible display panel 23 may be wound around a first roller 21 inserted into the first body 12, and a second side end portion of the length direction of the flexible display panel 23 may be wound around a second roller 22 inserted into the second body 13. Tension springs may be installed at the first roller 21 and the second roller 22 to apply tensile force to the flexible display panel 23. The first roller 21 and the second roller 22 may be rotated depending on a distance between the first body 12 and second body 13, and a display area of an image displayed on the flexible display panel 23 may be changed depending on rotation of the first roller 21 and the second roller 22.

The first body 12 has an internal space, and an opening 125 may be formed at one lateral surface thereof. The first body 12 may be substantially formed in a cuboid shape, and a first cover 14 may be coupled to a top surface of the first body 12. The first cover 14 may have a quadrangular plate shape, and a through-hole 141, through which the flexible display panel 23 passes, is formed through the first cover 14. The first roller 21 is rotatably installed in the first body 12.

The first supporting plate 31 is inserted and installed in the first body 12, and may be slidably drawn out of the first body 12. The first supporting plate may include a supporting pin 312 at a lateral surface thereof to face an inner wall surface of the first body 12. Mounting grooves 121, in which the first supporting plate 31 is inserted, are formed in an inner wall surface of the first body 12. The mounting grooves 121 are formed in the facing wall surfaces of the first body 12 to be elongated toward the opening 125.

A guide groove 123 is formed in the mounting groove 121, so the supporting pin 312 of the first supporting plate 31 is inserted into the guide groove 123 when the first supporting plate 31 slides into the mounting grooves 121. The guide groove 123 is formed to be elongated in a moving direction of the first supporting plate 31. The guide groove 123 may be formed in a straight line form or may be upwardly formed toward the opening 125.

Figure 6:
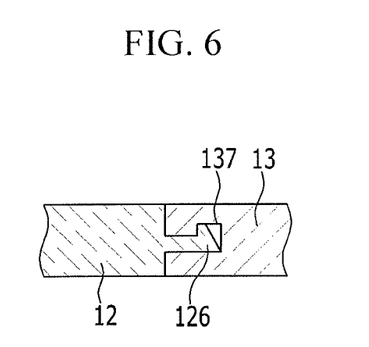
FIG. 6 illustrates a partial cross-sectional view of a state in which supporting plates of the display device according to the first exemplary embodiment are combined.

A catching protrusion 126 protruding toward the second body 13 is formed on the first body 12, and a locking groove 137 (FIG. 6), in which the catching protrusion 126 is inserted and locked, is formed in a lateral surface of the second body 13 facing the first body 12. The catching protrusion 126 is formed on a surface of the first body 12 directed toward the second body 13. When the catching protrusion 126 is inserted and locked into the locking groove 137, the first body 12 and the second body 13 are stably attached to each other, i.e., maintained in a state to directly contact each other. Further, a button to release a locking state of the catching protrusion 126 and the locking groove 137 may be installed on the first body 12.

The first supporting plate 31 is installed such that it moves in and out of the first body 12 through the opening 125 along a first direction, and opposing side ends of the first supporting plate 31 along a second direction perpendicular to the first direction are supported by the mounting groove 121. In addition, the supporting pins 312 inserted into the guide grooves 123 of the first body 12 are formed on the opposing lateral surfaces of the first supporting plate 31 to move along the first direction within the mounting grooves 121.

Figure 5:
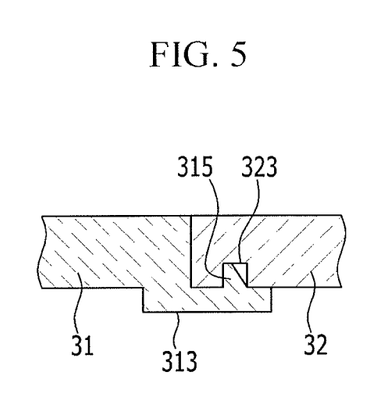
FIG. 5 illustrates a partial cross-sectional view of a state in which bodies of the display device according to the first exemplary embodiment are combined.

As shown in FIG. 1, a connecting protrusion 315 protruding from the first supporting plate 31 toward the second body 13 his formed on the first supporting plate 31, and a connecting groove 323 (FIG. 5), in which the connecting protrusion 315 is inserted, is formed in the second supporting plate 32. In detail, as illustrated in FIG. 5, a supporter 313 protrudes from the first supporting plate 31 toward the second supporting plate 32, and the connecting protrusion 315 protrudes upwardly from the supporter 313 to be inserted into the connecting groove 323 in a bottom of the second supporting plate 32. The supporter 313 may protrude from a lateral surface of the first supporting plate 31. The connecting groove 323 is formed in a bottom surface of the second supporting plate 32.

However, embodiments are not limited thereto. For example, the connecting protrusion may directly protrude from a lateral surface of the first body (without the supporter 313), while the connecting groove may be formed in a lateral surface of the second body directed toward the first body.

Referring back to FIG. 1, an opening 135 exposes an internal space in the second body 13, such that one side portion of the second body 13 is open. The opening 135 formed in the second body 13 is disposed to face the opening 125 formed in the first body 12. The second body 13 may be substantially formed in a cuboid shape, and a second cover 15 may be coupled to a top surface of the second body 13. The second cover 15 may have a quadrangular plate shape, and a through-hole 151, through which the flexible display panel 23 passes, is formed in the second cover 15. The second roller 22 may be rotatably installed in the second body 13.

The second supporting plate 32 is inserted and installed in the second body 13, and the second supporting plate 32 is installed to be slidable with respect to the second body 13. Mounting grooves 131, in which the second supporting plate 32 is inserted, are formed in the second body 13, wherein the mounting grooves 131 are formed in facing wall surfaces of the second body 13 to be elongated toward the opening 135.

A guide groove 133, in which a supporting pin 322 of the second supporting plate 32 is inserted, is formed in the mounting groove 131. The guide groove 133 is formed to be elongated in a moving direction of the second supporting plate 32. The guide groove 133 may be formed in a straight line form or may be upwardly formed toward the opening 135.

The second supporting plate 32 is installed to be movable in and out of the second body 13 through the opening 135, and opposing side ends of the second supporting plate 32 are supported by the mounting grooves 131. In addition, the supporting pins 322 inserted into the guide grooves 133 are formed on opposing lateral surfaces of the second supporting plate 32.

Figure 4:
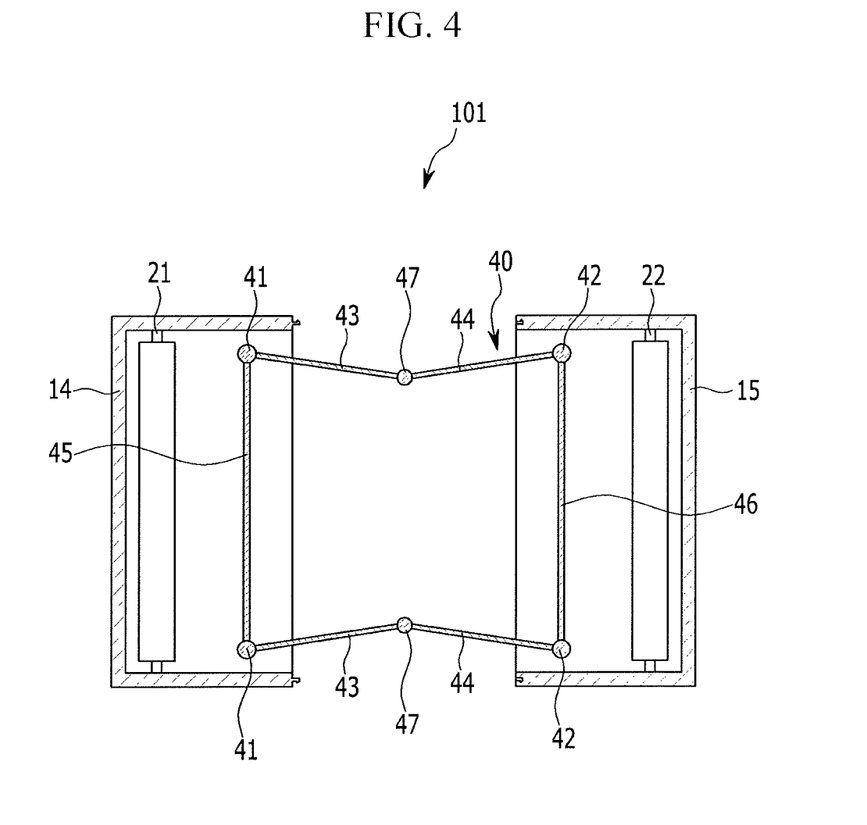
FIG. 4 illustrates a horizontal cross-sectional view of the display device according to the first exemplary embodiment.

FIG. 4 illustrates a horizontal cross-sectional view of the display device 101, as viewed from a top view.

As shown in FIGS. 1 and 4, the arm assembly 40 is installed in the first body 12 and the second body 13, and the arm assembly 40 includes supporting shafts 41 and 42 fixed to each of the first body 12 and the second body 13, connecting arms 43 and 44 rotatably coupled to the supporting shafts 41 and 42, and a variable shaft 47 connecting the connecting arms 43 and 44.

Two supporting shafts 41 are installed on the first body 12 to be separated from each other in a width direction, and fixing arms 45 connecting and fixing the supporting shafts 41 are installed at the supporting shafts 41. Each of the connecting arms 43 is rotatably coupled to each of the supporting shafts 41, and the connecting arms 43 are elongated toward the second body 13. Further, two supporting shafts 42 are installed on the second body 13 to be separated from each other in a width direction, and fixing arms 46 connecting and fixing the supporting shafts 42 are installed at the supporting shafts 42. Each of the connecting arms 44 is rotatably coupled to each of the supporting shafts 42, and the connecting arms 44 are elongated toward the first body 12.

The connecting arms 43 connected to the first body 12 are rotatably connected to the connecting arms 44 connected to the second body 13 with the variable shaft 47 therebetween. The variable shaft 47 is not fixed to the first body 12 or the second body 13, but is movably installed at the first body 12 or the second body 13.

In the first exemplary embodiment, the supporting shafts 41 and 42 are connected by two connecting arms 43 and 44, but embodiments are not limited thereto. For example, the supporting shafts may be connected by at least two connecting arms.

The arm assembly 40 supports the first body 12 and the second body 13, and is inserted into or moved out of the interiors of the first body 12 and the second body 13. That is, as illustrated in FIG. 1, portions of the arm assembly 40 are on, e.g., directly on, a bottom of each of the first and second bodies 12 and 13, and the guide grooves 123 and 133 supporting the first and second supporting plates 31 and 32, respectively, are on interior lateral surfaces of the first and second bodies 12 and 13 above the arm assembly 40. As such, when the first and second supporting plates 31 and 32 slide in the respective guide grooves 123 and 133 out of the first and second bodies 12 and 13, the respective arm assembly portions slide out of the respective first and second bodies 12 and 13 with the first and second supporting plates 31 and 32 to support the first and second supporting plates 31 and 32 outside of the first and second bodies 12 and 13, respectively.

As shown in FIGS. 1-2, as the first body 12 and the second body 13 directly contact each other, the first and second supporting plates 31 and 32 slide completely inside the first and second bodies 12 and 13, respectively, so the connecting arms 43 and 44 are folded to be inserted into the first body 12 and the second body 13 under the first and second supporting plates 31 and 32, respectively. As shown in FIG. 4, as the first body 12 and the second body 13 are separated from each other, the connecting arms 43 and 44 are drawn out of and spread from the first body 12 and the second body 13.

Figure 3:
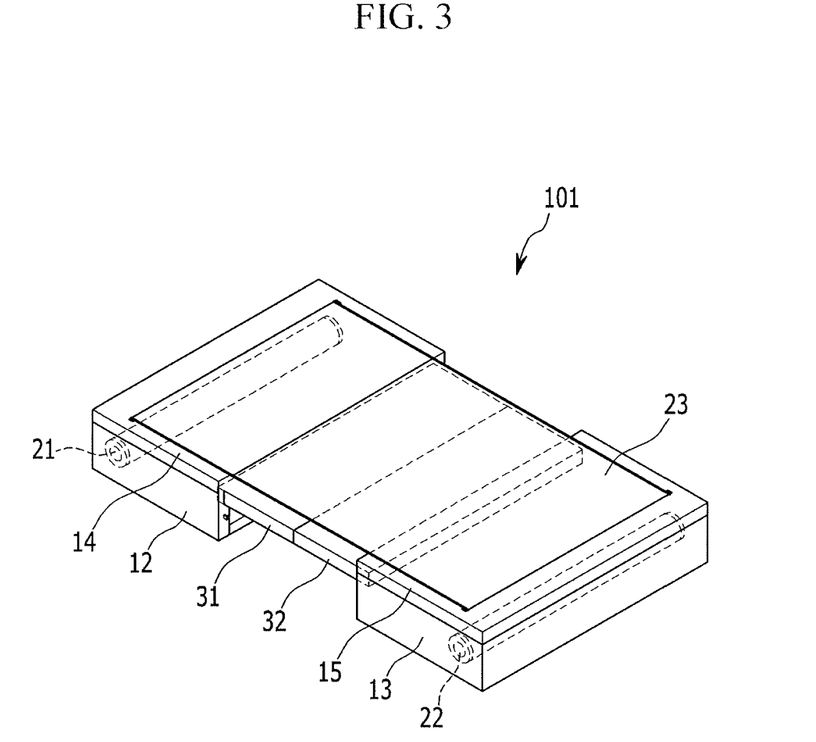
FIG. 3 illustrates an unfolded perspective view of the display device according to the first exemplary embodiment.

In addition, as a distance between the first body 12 and the second body 13 increases, the first and second supporting plates 31 and 32 are respectively drawn from the first body 12 and the second body 13 (FIG. 3) to be supported by the arm assembly 40. As the supporting pins 312 and 322 directly contact the length-directional end portions of the guide grooves 123 and 133, the first and second supporting plates 31 and 32 support the first and second bodies 12 and 13 such that the distance between the first and second bodies 12 and 13 does not increase further.

As described above, according to the first exemplary embodiment, since the first and second bodies 12 and 13 are supported by the arm assembly 40, the first and second bodies 12 and 13 may be easily moved with respect to each other. Further, since the first and second supporting plates 31 and 32 are installed, the flexible display panel 23 may be easily spread over and supported by the first and second supporting plates 31 and 32.

A display device according to a second exemplary embodiment will now be described with reference to FIGS. 7 and 8. Distinctive features different from those in the first exemplary embodiment will be described.

Figure 7:
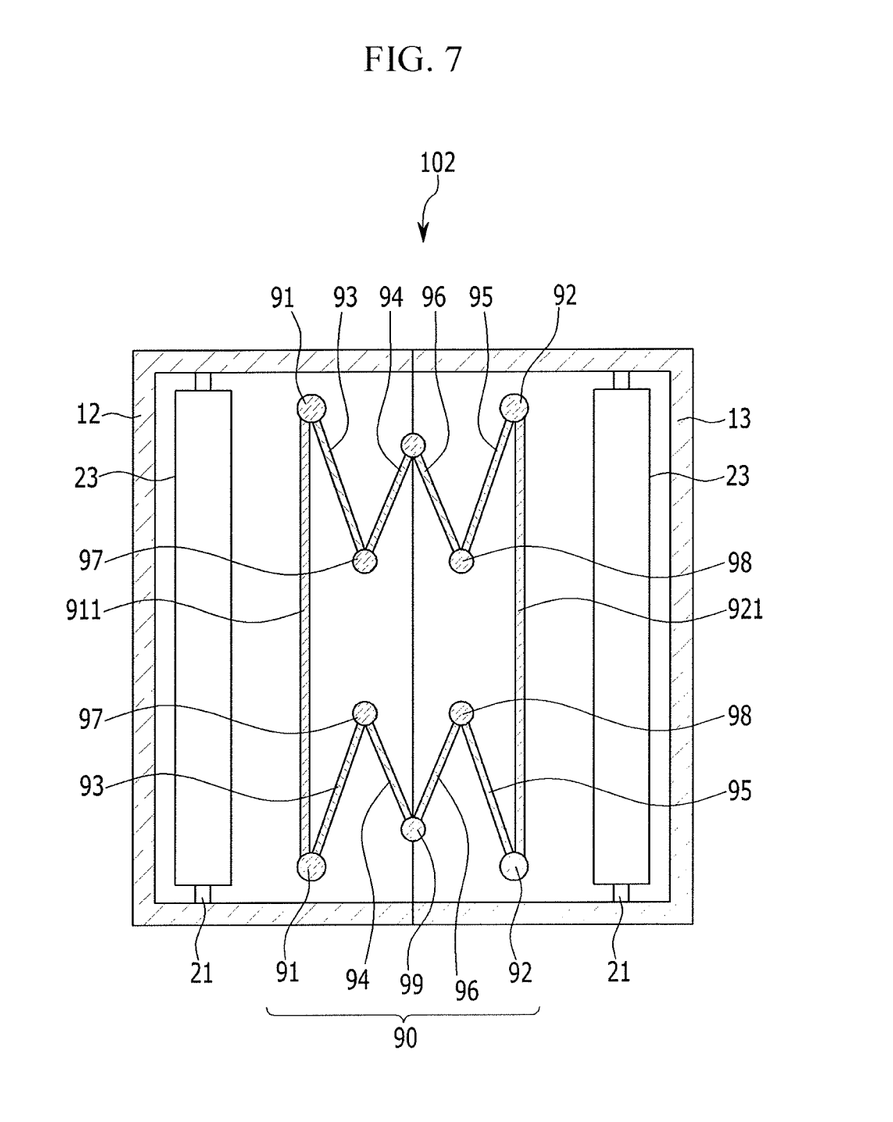
FIG. 7 illustrates a horizontal cross-sectional view of the display device according to a second exemplary embodiment.

FIG. 7 illustrates a horizontal cross-sectional view of an assembled display device according to the second exemplary embodiment. FIG. 8 is a horizontal cross-sectional view illustrating a state in which bodies of the display device according to the second exemplary embodiment are separated from each other.

Figure 8:
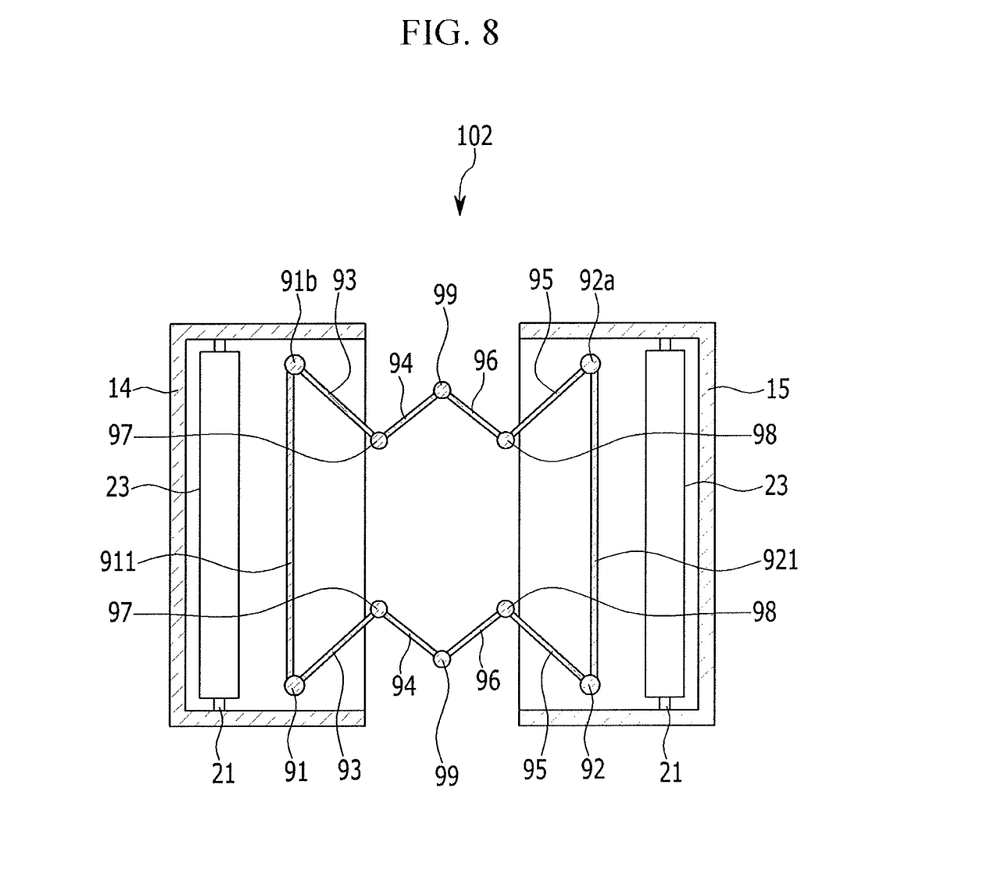
FIG. 8 illustrates a horizontal cross-sectional view of a state in which bodies of the display device according to the second exemplary embodiment are separated from each other.

As shown in FIGS. 7 and 8, a display device 102 according to the second exemplary embodiment includes the flexible display panel 12, the first body 12, the second body 13, an arm assembly 90, the first supporting plate, and the second supporting plate.

The arm assembly 90 is installed in the first and second bodies 12 and 13, and the arm assembly 90 includes supporting shafts 91 and 92 fixed to the first and second bodies 12 and 13, connecting arms 93, 94, 95, and 96 rotatably coupled to the supporting shafts 91 and 92, and variable shafts 97, 98, and 99 connecting the connecting arms 93, 94, 95, and 96.

Two supporting shafts 91 are installed on the first body 12 to be separated from each other in a width direction, and fixing arms 911 connecting and fixing the supporting shafts 91 are installed at the supporting shafts 91. Each of the connecting arms 93 is rotatably coupled to each of the supporting shafts 91, and the connecting arms 93 are elongated toward the second body 13. The variable shaft 97 is rotatably installed at the connecting arm 94, and the connecting arm 95 is rotatably installed at the variable shaft 97.

Further, two supporting shafts 92 are installed on the second body 13 to be separated from each other in a width direction, and fixing arms 921 connecting and fixing the supporting shafts 92 are installed at the supporting shafts 92. Each of the connecting arms 95 is rotatably coupled to each of the supporting shafts 92, and the connecting arms 95 are elongated toward the second body 13. The variable shaft 98 is rotatably installed at the connecting arm 95, and the connecting arm 96 is rotatably installed at the variable shaft 98.

The connecting arm 94 connected to the first body 12 is rotatably connected to the connecting arm 96 connected to the second body 13 with the variable shaft 99 therebetween. The variable shafts 97, 98, and 99 are not fixed to the first body 12 or the second body 13, but are movably installed at the first body 12 or the second body 13. In the second exemplary embodiment, the supporting shafts 91 and 92 are connected to each other with four connecting arms 93, 94, 95, and 96.

The arm assembly 90 supports the first and second bodies 12 and 13, and is inserted into or drawn from the first and second bodies 12 and 13 depending on movement of the first and second bodies 12 and 13. As shown in FIG. 7, as the first and second bodies 12 and 13 directly contact each other, the connecting arms 93 and 94 are folded to be inserted into the first and second bodies 12 and 13. As shown in FIG. 8, as the first and second bodies 12 and 13 are separated from each other, the connecting arms 93, 94, 95, and 96 are drawn and spread from the first and second bodies 12 and 13.

A display device according to a third exemplary embodiment will be described with reference to FIGS. 9 to 11. Distinctive features different from those of the first exemplary embodiment will be described.

Figure 9:
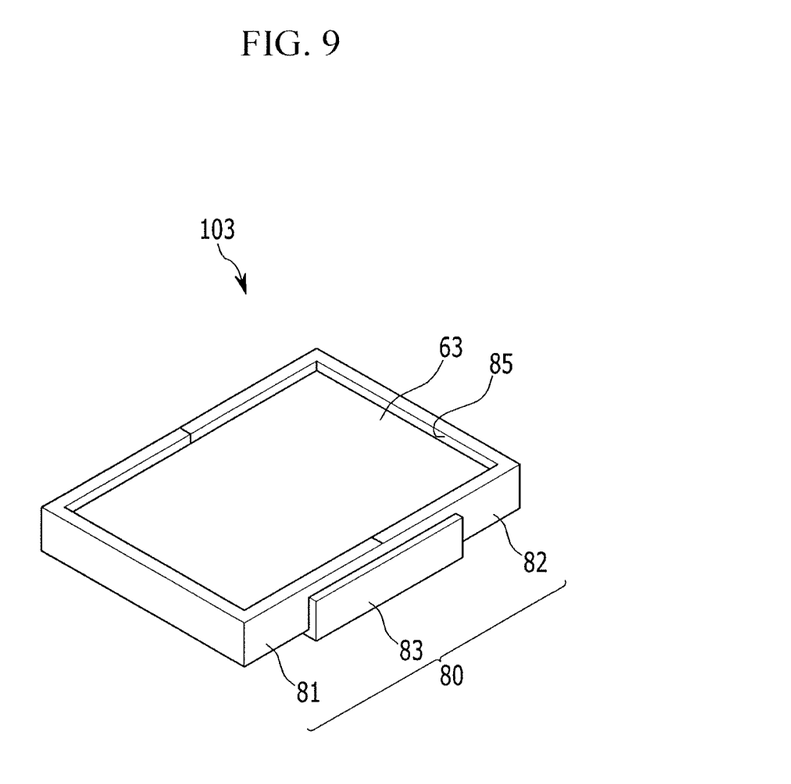
FIG. 9 illustrates a perspective view of a display device according to a third exemplary embodiment.
Figure 10:
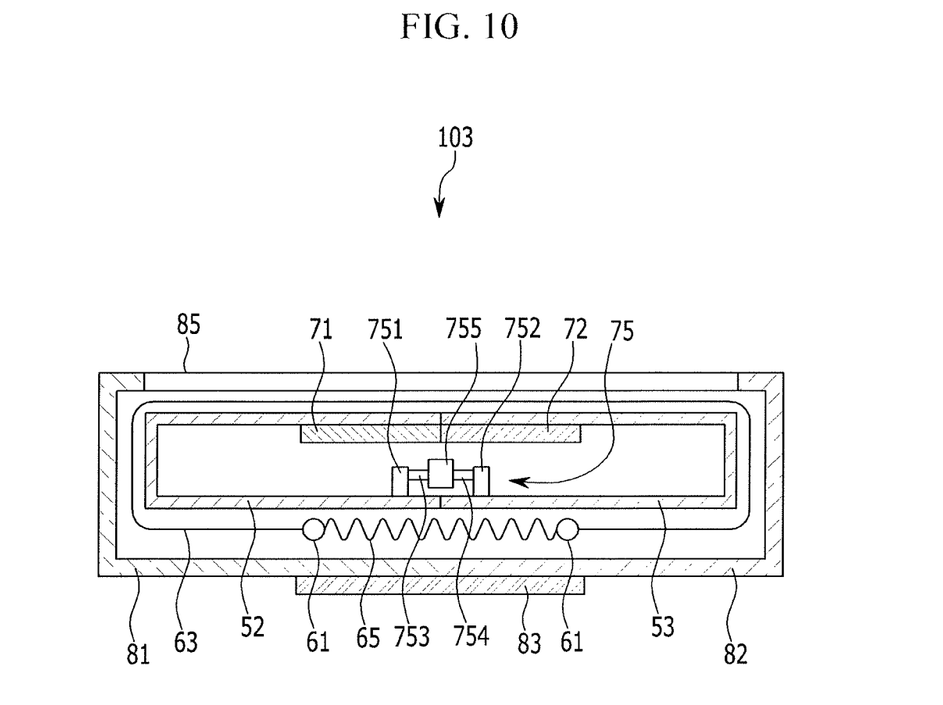
FIG. 10 illustrates a vertical cross-sectional view of the display device according to the third exemplary embodiment.
Figure 11:
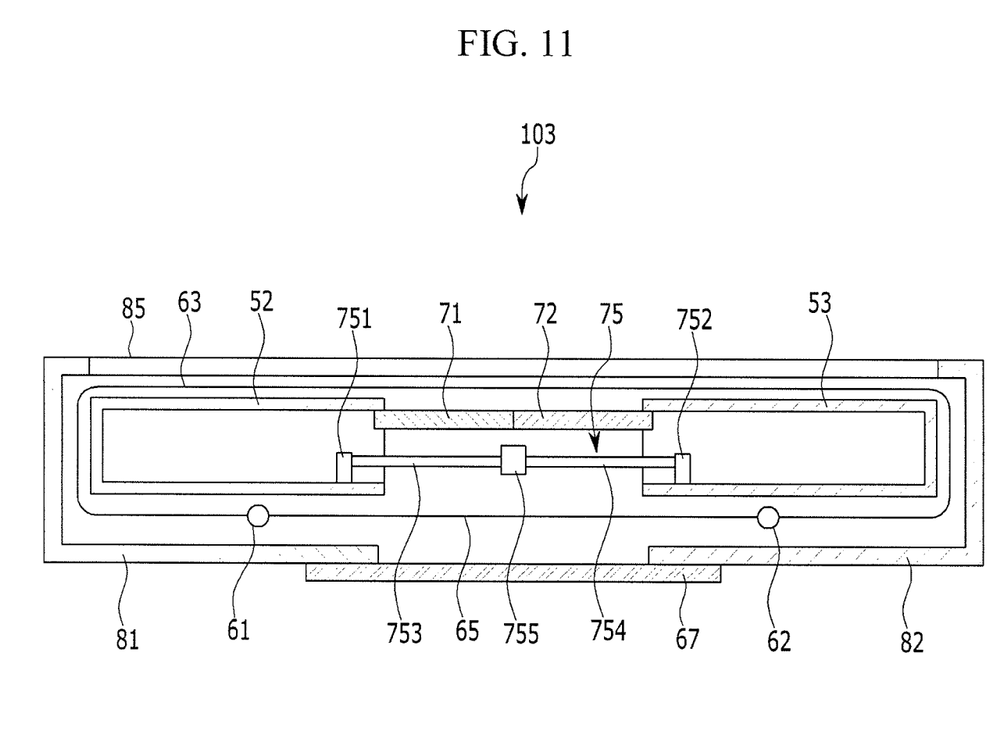
FIG. 11 illustrates an enlarged vertical cross-sectional view of the display device according to the third exemplary embodiment.

FIG. 9 illustrates a perspective view of a display device according to the third exemplary embodiment, FIG. 10 illustrates a vertical cross-sectional view of the display device according to the third exemplary embodiment, and FIG. 11 is an enlarged vertical cross-sectional view of the display device according to the third exemplary embodiment.

As shown in FIGS. 9-10, a display device 103 according to the third exemplary embodiment may include a flexible display panel 63, a first body 52, a second body 53, an arm assembly 75, a first supporting plate 71, a second supporting plate 72, and a housing 80 accommodating the bodies.

The first body 52 has an internal space, and an opening is formed at one lateral surface thereof. The first body 52 may be substantially formed in a cuboid shape, and the first supporting plate 71 is slidably inserted and installed therein. The second body 53 has an internal space, and an opening is formed at one lateral surface thereof. The second body 53 may be substantially formed in a cuboid shape, and the second supporting plate 72 is slidably inserted and installed therein.

As shown in FIGS. 10 and 11, the arm assembly 75 is installed at the first and second bodies 52 and 53, and the arm assembly 75 includes supporting shafts 751 and 752 fixed to each of the first body 52 and the second body 53, connecting arms 753 and 754 rotatably coupled to the supporting shafts 751 and 752, and a variable shaft 755 connecting the connecting arms 753 and 754.

Two supporting shafts 751 are separately disposed at the first body 52 in a width direction of the first body 52. The connecting arm 753 that is elongated toward the second body 53 is rotatably coupled to the supporting shaft 751.

Further, the two supporting shafts 752 are separately disposed in a width direction at the second body 53, and each of the connecting arms 754 elongated toward the second body 53 is rotatably coupled to each of the supporting shafts 752. The connecting arm 753 connected to the first body 52 is coupled to the connecting arm 754 connected to the second body 53 with the variable shaft 755 therebetween.

The first body 52 and the second body 53 are inserted in the housing 80, and the housing 80 may include a first case 81, a second case 82, and an intermediate case 83 connecting the first case 81 and the second case 82. The housing 80 may be made of plastic or a metallic material, e.g., forming an outer shape of a smart phone or a tablet PC. The intermediate case 83 supports the first case 81 and the second case 82, and the first case 81 and the second case 82 are slidably installed with respect to the intermediate case 83. The intermediate case 83 is formed to surround a bottom surface and lateral surfaces of the first and second cases 81 and 82.

In addition, the first case 81 is fixed to the first body 52, and the second case 82 is fixed to the second body 53. An opening 85 is formed to expose the flexible display panel 63 on a top surface of the housing 80.

The flexible display panel 63 displays images, moving pictures, or texts that are processed in the display device. For example, when the display device is a portable terminal, e.g., a mobile phone, the flexible display panel 63 may display images of a user interface (UI), a graphical user interface (GUI), or the like that is associated with a call. The flexible display panel 63 may include flexible substrates or films facing each other with a liquid crystal or an organic light emitting element therebetween.

The flexible display panel 63 has a flexible characteristic, and it may enter into the first body 52 and the second body 53 or drawn back therefrom. A first supporting rod 61 is formed at one side end portion of a length direction of the flexible display panel 63, and a second supporting rod 62 is formed at the other side end portion of the length direction of the flexible display panel 63 (FIG. 10).

The first supporting rod 61 and the second supporting rod 62 are coupled to an elastic body 65 therebetween, and the elastic body 65 may be made of a spring, a cord with elasticity, and the like. The flexible display panel 63 is installed to surround the first body 52 and the second body 53 in the housing 80, and the first supporting rod 61 is disposed under the first body 52, while the second supporting rod 62 is disposed under the second body 53. Further, the first supporting rod 61 is disposed between the first body 52 and a bottom of the housing 80, and the second supporting rod 62 is disposed between the second body 53 and the bottom of the housing 80.

As shown in FIG. 10, when the first case 81 and the second case 82 directly contact each other, an elastic body 65 maintains a contacted state. As shown in FIG. 11, when the first case 81 and the second case 82 are separated from each other, the first body 52 and the second body 53 are simultaneously separated from each other, and in this case, the elastic body 65 is extended such that a distance between the first supporting rod 61 and the second supporting rod 62 increases. Further, since an area of the opening 85 increases, a display area of the flexible display panel 63 for displaying images increases.

As described above, according to the third exemplary embodiment, since the flexible display panel 63 is not rolled up, damage to the flexible display panel 63 due to curvature may be prevented.

By way of summation and review, in a conventional folded flexible display device, a repeatedly folded portion, which is mainly a center portion of the foldable flexible display device, may cause defects, thereby causing inconvenience in use. In addition, in a conventional rolled flexible display device, a user holds the rolled flexible display device by hand to flatly maintain it, thereby causing inconvenience in long stable use.

Therefore, according to embodiments, a display device includes an arm assembly supporting a display panel, thereby having a stable structure even with an enlarged screen. Therefore, it is possible to display images that are optimized for a flexible characteristic of the flexible display panel.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device, comprising:
   a first body including a first internal space and a first opening at a first side of the first body;
   a second body including a second internal space and a second opening at a first side of the second body, the second opening facing the first opening;
   a flexible display panel to display images, the flexible display panel having a changeable display area in accordance with a distance between the first and second bodies; and
   an arm assembly including a plurality of fixed arms and a plurality of connecting arms supporting the first and second bodies, the plurality of connecting arms being rotatably coupled to the first and second bodies.

2. The display device as claimed in claim 1, wherein the arm assembly further comprises:
   supporting shafts fixed to each of the first and second bodies;
   each of the fixed arms connecting the supporting shafts in each of the first and second bodies;
   connecting arms rotatably coupled to the supporting shafts; and
   a variable shaft connecting the connecting arms and being rotatably installed with respect to the connecting arms.

3. The display device as claimed in claim 2, wherein two first supporting shafts separated from each other are in the first body, two second supporting shafts separated from each other are in the second body, connecting arms are rotatably positioned at each of the first and second supporting shafts, and the variable shaft rotatably connects the connecting arms respectively connected to the first and second bodies.

4. The display device as claimed in claim 1, further comprising a first cover coupled to the first body and a hole through the first cover, the flexible display panel passing through the hole.

5. The display device as claimed in claim 1, further comprising a first supporting plate slidably coupled to the first body.

6. The display device as claimed in claim 5, further comprising a mounting groove in an inner wall surface of the first body, the first supporting plate being inserted into the mounting groove.

7. The display device as claimed in claim 6, further comprising:
   a supporting pin protruding from a lateral surface of the first supporting plate; and
   a guide groove in the mounting groove and elongated in a moving direction of the first supporting, the supporting pin being inserted into the guide groove.

8. The display device as claimed in claim 5, further comprising a second supporting plate slidably coupled to the second body, a side end of the first supporting plate facing a side end of the second supporting plate.

9. The display device as claimed in claim 8, further comprising a connecting protrusion on the first supporting plate and protruding toward the second supporting plate, the connecting protrusion being inserted into a connecting groove in the second supporting plate.

10. The display device as claimed in claim 1, further comprising a catching protrusion on the first body and protruding toward the second body, the catching protrusion being inserted and locked into a locking groove in a lateral surface of the second body facing the first body.

11. The display device as claimed in claim 1, further comprising:
    a first roller in a first body, a first side end portion of a length direction of the flexible display panel being wound around the first roller; and
    a second roller in a second body, a second side end portion of the length direction of the flexible display panel being wound on the second roller.

12. The display device as claimed in claim 1, further comprising:
    a first supporting rod at a first side end portion of a length direction of the flexible display panel; and
    a second supporting rod at a second side end portion of the length direction of the flexible display panel, the flexible display panel surrounding the first and second bodies, and the first and second supporting rods are respectively disposed under the first and second bodies.

13. The display device as claimed in claim 12, wherein the first and second supporting rods are coupled to each other with an elastic body therebetween.

* * * * *